United States Patent [19]

Tayama et al.

[11] Patent Number: 4,530,952
[45] Date of Patent: Jul. 23, 1985

[54] POLYPHENYLENE ETHER COMPOSITION IMPROVED IN PROCESSABILITY

[75] Inventors: Toshiyuki Tayama; Ryohei Tanaka, both of Ibaraki, Japan

[73] Assignee: Mitsubishi Petrochemical Co., Ltd., Tokyo, Japan

[21] Appl. No.: 564,190

[22] Filed: Dec. 22, 1983

[30] Foreign Application Priority Data

Dec. 29, 1982 [JP] Japan .................... 57-233289

[51] Int. Cl.³ .................... C08K 5/20; C08L 71/04
[52] U.S. Cl. .................... 524/159; 524/157; 524/207; 524/226; 524/227; 524/228; 524/229; 524/504; 524/508; 524/611
[58] Field of Search .......... 524/226, 227, 228, 229, 524/508, 504, 157, 159, 207

[56] References Cited

U.S. PATENT DOCUMENTS

| 2,474,776 | 6/1949 | Campbell | 524/228 |
|---|---|---|---|
| 2,758,982 | 8/1956 | Wicklatz | 524/226 |
| 2,937,203 | 5/1960 | Fuller | 524/226 |
| 3,474,063 | 10/1969 | Powell | 524/229 |
| 3,734,878 | 5/1973 | von Dohlen | 524/226 |
| 3,751,388 | 8/1973 | Tabana | 524/227 |
| 3,821,179 | 6/1974 | Powell | 524/229 |
| 3,846,391 | 11/1974 | Powell | 524/228 |
| 4,154,707 | 5/1979 | Honsberg | 524/226 |

FOREIGN PATENT DOCUMENTS

| 0110740 | 10/1974 | Japan | 524/229 |
|---|---|---|---|
| 0005752 | 1/1982 | Japan | 524/229 |
| 985937 | 3/1965 | United Kingdom | 524/228 |

*Primary Examiner*—C. Warren Ivy
*Attorney, Agent, or Firm*—Oblon, Fisher, Spivak, McClelland & Maier

[57] ABSTRACT

A polyphenylene ether composition comprising polyphenylene ether or a composition containing polyphenylene ether and styrene resin, and a diamide compound represented by the following formula.

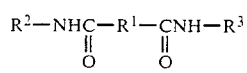

This composition is improved in processability due to high flowability, with a minimum of decrease in heat resistance.

9 Claims, 4 Drawing Figures

POLYPHENYLENE ETHER COMPOSITION IMPROVED IN PROCESSABILITY

BACKGROUND OF THE INVENTION

1. Field of the Invention

The present invention relates to a polyphenylene ether composition, and more particularly to a polyphenylene ether composition improved in processability.

2. Description of the Prior Art

Polypheneylene ether is a noteworthy engineering plastics material which is very useful on account of its outstanding electrical and mechanical properties, high heat distortion temperature, and self-extinguishing properties. On the other hand, it has some disadvantages. It is slightly brittle due to low impact resistance. It has a high melting point and a high melt viscosity, and therefore it requires a high molding temperature and molding pressure. This leads to the difficulty in its melt processing.

In order to improve the processability of polyphenylene ether, there was proposed resin blending. For example, Japanese Patent Publication No. 17812/1967 discloses the blending of polyphenylene ether with high-impact polystyrene resin. The composition obtained by blending is improved in processability and impact resistance, but the improvement in processability is not satisfactory.

There was proposed a way of improving the processability of polyphenylene ether by adding a plasticizer to polyphenylene ether. For example, according to Japanese Patent Publication No. 5220/1974, the processability of polyphenylene ether is improved by incorporating polyphenylene ether or a composition of polyphenylene ether and styrene resin with a compound selected from aromatic organic acid ester, polyester having aromatic groups, organic phosphoric ester having aromatic groups, and chlorinated aromatic hydrocarbon which are highly miscible with polyphenylene ether resin.

When incorporated with a plasticizer such as organic phosphate ester having aromatic groups, polyphenylene ether or a composition of polyphenylene ether and styrene resin is improved in processability but becomes extremely poor in thermal properties. This is attributable to the fact that the incorporated plasticizer disperses very uniformly into the matrix of polyphenylene or a composition of polyphenylene ether and styrene resin, lowering the glass transition point (Tg) of the matrix and consequently decreasing the heat resistance of the matrix.

The present inventors conceived that the additive should have the following characteristics if the processability (flowability) is to be improved without sacrificing the thermal performance (heat resistance).

(1) It should be highly miscible with the matrix at the time of processing or when the system is in the flowing state, so that it produces the effect of improving flowability like a plasticizer.

(2) It should separate from the matrix when the matrix is not flowing (at a temperature lower than the glass transition point of the matrix), so that it does not lower the Tg of the matrix. And yet it should have a certain degree of miscibility with the matrix, so that it keeps a certain level of interface bond strength and keeps the mechanical strength even when it has separated from the matrix.

In order to find the compound that satisfies the above two conditions simultaneously, the present inventors carried out extensive studies and concluded that such a compound should satisfy the following three conditions.

(a) It is a low-molecular compound having a constituent unit which is miscible with the matrix (polyphenylene ether and styrene resin) and works as a plasticizer at the time of processing or when the system is in the flowing state.

(b) It is a compound which crystallizes and separates from the matrix phase at a temperature lower than the processing temperature (or the Tg of the matrix).

(c) It is a compound which has a comparatively high polarity, so that it brings about with certainty the crystallization at a temperature lower than the processing temperature. It is a compound having a unit which has affinity for the matrix (polyphenylene ether and styrene resin) so that it keeps the interface bond strength with the matrix even when it crystallizes and separates from the matrix phase.

SUMMARY OF THE INVENTION

It is an object of the present invention to provide a means to improve the processability of polyphenylene ether or a composition of polyphenylene ether and styrene resin.

In other words, it is an object of this invention to provide a polyphenylene ether composition having improved processability, said composition comprising polyphenylene ether or a composition of polyphenylene ether and styrene resin, and a diamide compound represented by the following formula.

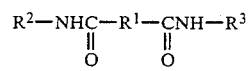

where $R^1$ is a $C_{1\text{-}10}$ linear or branched saturated or unsaturated aliphatic hydrocarbon residue, alicyclic hydrocarbon residue, or aromatic hydrocarbon residue, or a residue of a derivative thereof; and $R^2$ and $R^3$ are $C_{1\text{-}10}$ linear or branched saturated or unsaturated aliphatic hydrocarbon residues, alicyclic hydrocarbon residues, or aromatic hydrocarbon residues, or residues of derivatives thereof, and $R^2$ and $R^3$ are the same or different from each other.

Figure 1:
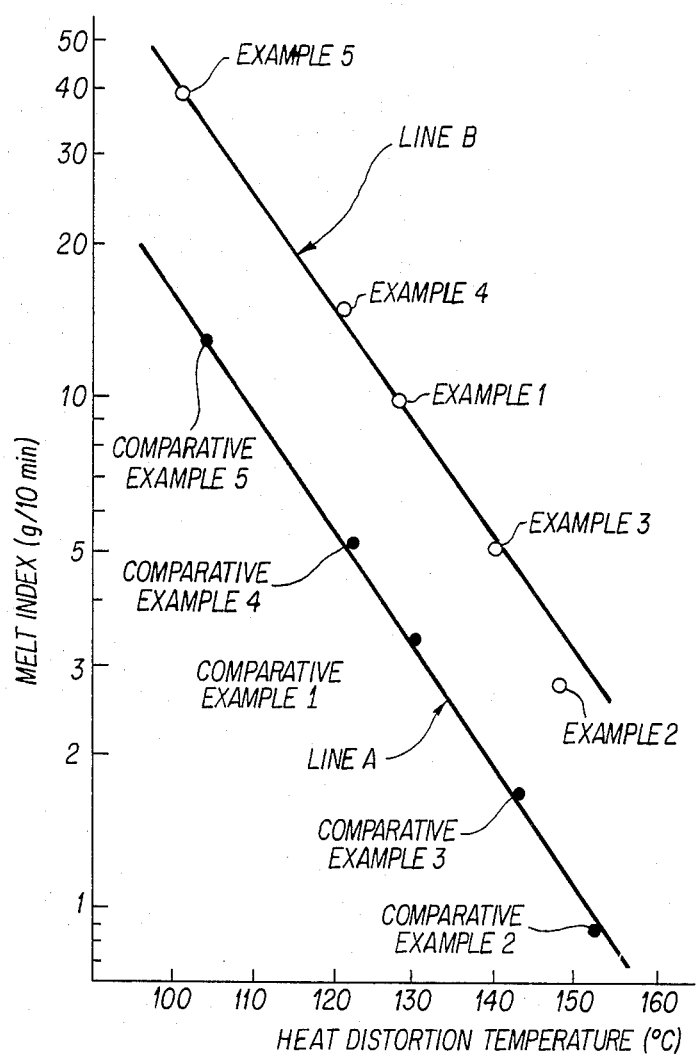
FIGS. 1 and 2 are graphs showing the relationship between the melt index and the heat resistance of polyphenylene ether compositions produced according to this invention and the conventional method.

DETAILED DESCRIPTION OF THE INVENTION (1) Polyphenylene ether:

The polyphenylene ether used in this invention has the repeating structural unit represented by the formula:

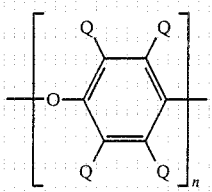

where the ether oxygen atom in one unit is connected to the benzene nucleus of the adjacent unit; n is at least 50; and Q is a monovalent substituent group which is independently selected from the group consisting of hydrogen, halogen, hydrocarbon group containing no tertiary-α-carbon atom, halohydrocarbon group having at least two carbon atoms between the halogen atom and the phenyl nucleus, and halohydrocarbon oxy group having at least two carbon atoms between the halogen atom and the phenyl nucleus.

The typical examples of polyphenylene ether include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dibutyl-1,4-phenylene) ether, poly(2,6-dipropenyl-1,4-phenylene) ether, poly(2,6-dilauryl-1,4-phenylene) ether, poly(2,6-diphenyl-1,4-phenylene) ether, poly(2,6-dimethoxy-1,4-phenylene) ether, poly(2,6-diethoxy-1,4-phenylene) ether, poly(2-methoxy-6-ethoxy-1,4-phenylene) ether, poly(2-ethyl-6-stearyloxy-1,4-phenylene) ether, poly(2,6-dichloro-1,4-phenylene) ether, poly(2-methyl-6-phenyl-1,4-phenylene) ether, poly(2,6-dibenzyl-1,4-phenylene) ether, poly(2-ethoxy-1,4-phenylene) ether, poly(2-chloro-1,4-phenylene) ether, and poly(2,5-dibromo-1,4-phenylene) ether, and equivalents thereof. They also include a copolymer of 2,6-dimethylphenol and 2,3,6-trimethylphenol, a copolymer of 2,6-dimethylphenol and 2,3,5,6-tetramethylphenol, and a copolymer of 2,6-diethylphenol and 2,3,6-trimethylphenol.

The polyphenylene ether used in this invention also includes modified polyphenylene ether produced by grafting styrene monomer (such as styrene, p-methylstyrene, and α-methylstyrene) onto the polyphenylene defined by the above-mentioned formula.

The above-mentioned polyphenylene ether can be produced by such known methods as disclosed in U.S. Pat. Nos. 3,306,874, 3,306,875, 3,257,357, and 3,257,358; Japanese Patent Publication No. 17880/1977; and Japanese Patent Laid-open No. 51197/1975.

The group of the polyphenylene ethers preferable for this invention include one which has one each of alkyl substituent group at the two ortho positions with respect to the ether oxygen atom; a copolymer of 2,6-dialkylphenol and 2,3,6-trialkylphenol; and a graft polymer obtained by grafting styrene monomer onto the polyphenylene ether skeleton.

(2) Styrene resin

The styrene resin used in this invention includes homopolymers such as polystyrene, poly-α-methylstyrene, poly-p-methylstyrene and a high impact polystyrene comprising polystyrene modified with a rubber selected from the group consisting of butadiene rubber, styrene-butadiene copolymer, ethylene-propylene copolymer, or ethylene-propylenediene terpolymer, styrene-butadiene copolymer and stryene-acrylonitrile-butadiene copolymer. The styrene resin is incorporated in an amount of 0 to 2,000 parts by weight, preferably 3 to 500 parts by weight, based on 100 parts by weight of polyphenylene ether resin.

(3) Addition of other polymers

The polyphenylene ether or the composition of polyphenylene ether and styrene resin may be incorporated further with other polymers in order to improve impact resistance.

The polymers to be added are natural or synthetic rubbery polymers. They include, for example, natural rubber, polyisoprene, polybutadiene, ethylene-propylene copolymer, and ethylene-propylene-nonconjugated diene terpolymer.

Polymers provided with sensitivity by the introduction of polar groups can also be used. Examples include the above-mentioned rubbery polymer provided with sensitivity, and polyethylene, ethylene-vinyl acetate copolymer, polypropylene, and other polyolefins provided with sensitivity.

The sensitivity can be imparted by grafting to the above-mentioned polymer an unsaturated organic acid or an anhydride thereof (e.g., acrylic acid, methacrylic acid, itaconic acid, and anhydrides thereof) or an unsaturated silane compound (e.g., vinyltrimethoxysilane, vinyltriethoxysilane, vinyltriacetoxysilane, γ-methacryloxypropyltrimethoxysilane, and propenyltrimethoxysilane) represented by the formula:

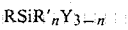

(where R is an ethylenic unsaturated hydrocarbyl or hydrocarbyloxy group; R' is an aliphatic saturated hydrocarbyl group; Y is a hydrolyzable organic group; and n is 0, 1, or 2; and where there are two or three Y's, they may the same or different), or by changing the above-mentioned graft-modified rubbery polymer or resinous polymer into an ionomer. (An ionomer is produced by introducing metal ions into a part of the carboxyl groups connected to the graft chains of the polymer.)

The polymer provided with sensitivity can also be obtained by block- or random-polymerization of ethylene and vinyl monomer (such as an unsaturated organic acid e.g., acrylic acid, and an ester thereof, having polar group) or vinyl silane.

The rubbery polymer or the polymer provided with sensitivity is incorporated in an amount of 0.5 to 50 wt %, preferably 2 to 4 wt %, based on the weight of the total polymer components.

In the case where the polymer provided with sensitivity is used, it is preferable to add an inorganic filler. In the case where the sensitivity-provided polymer and an inorganic filler are used in combination with each other, a special structure is formed in which the sensitivity-provided polymer is dispersed into polyphenylene ether or a composition of polyphenylene ether and styrene resin and the inorganic filler is selectively filled into the sensitivity-provided polymer. Such a structure provides outstanding mechanical strength.

The inorganic filler is inorganic powder such as titanium oxide, zinc oxide, talc, clay, calcium carbonate, and silica which are known as fillers for synthetic resins.

The inorganic filler should have an average particle diameter of 0.05 to 1.0 micron. It is used in an amount of 0.5 to 60 wt %, preferably 1 to 45 wt %, based on the weight of the resulting composition.

Other polymers include polyphenylene ether-grafted polyolefin and polystyrene-grafted polyolefin.

The polyphenylene ether-grafted polyolefin can be obtained by grafting glycidylated polyphenylene ether onto a polyolefin having carboxyl group or acid anhydride group on the main chain or side chain thereof. The glycidylated polyphenylene ether can be obtained by reacting polyphenylene ether with epichlorohydrin. The polyolefin having carboxyl group or acid anhydride group on the main chain or side chain thereof includes, for example, ethylene-acrylic acid copolymer, ethylene-methacrylic acid copolymer, maleic anhydride-modified polypropylene, maleic anhydride-modified polyethylene, and maleic anhydride-modified ethylene-vinyl acetate copolymer.

The polyphenylene ether-grafted polyolefin can also be obtained by grafting polyphenylene other onto a polyolefin having a glycidyl group on the side chain, such as ethylene-glycidyl methacrylate copolymer, and ethylene-vinyl acetate-glycidyl methacrylate copolymer.

The polyphenylene ether moiety of the graft polymer should preferably have a molecular weight of 5,000 to 100,000, and the number-average molecular weight of the polyolefin chain should be 100 to 100,000, preferably 3,000 to 50,000.

The polystyrene-grafted polyolefin can be obtained by grafting a styrene copolymer onto a polyolefin, said styrene copolymer having a carboxylic acid group or a cyclic acid anhydride group on the main chain or side chain of polystyrene, e.g., styrene-maleic anhydride copolymer, styrene-citraconic anhydride copolymer, styrene-itaconic anhydride copolymer, styrene-asconit anhydride copolymer, styrene-acrylic acid copolymer, and styrene-methacrylic acid copolymer; and said polyolefin having a glycidyl group on the side chain, e.g., ethylene-glycidyl methacrylate copolymer and ethylene-vinyl acetate-glycidyl methacrylate copolymer.

The styrene copolymer having carboxyl group or cyclic acid anhydride group on the main chain or side chain, which is used for producing the polystyrene-grafted polyolefin in this invention, should preferably contain more than 50 wt % of styrene units and more than 3 wt % of carboxyl group units or cyclic acid anhydride units.

The polyolefin having a glycidyl group on the side chain, which is used for synthesis of the graft polymer, should have a number average molecular weight of 1,000 to 100,000, preferably 3,000 to 50,000.

The polyphenylene ether-grafted polyolefin is used in an amount of 0.1 to 50 wt %, preferably 1 to 30 wt %, and the polystyrene-grafted polyolefin is used in an amount of 1 to 80 wt %, preferably 1 to 30 wt %, based on the total polymer such as the total weight of polyphenylene ether or a composition of polyphenylene ether and styrene resin, and polyphenylene ether-grafted polyolefin and/or polystyrene-grafted polyolefin.

The grafted polyolefin may be added after graft polymerization. In the case where a polyolefin having glycidyl groups is used, the grafting reaction can be accomplished by mixing it with polyphenylene ether or styrene resin having a carboxyl group or a carboxylic acid anhydride group at a high temperature above 150° C.

Thus, mixing a polyolefin containing glycidyl groups and polyphenylene ether or a composition of polyphenylene ether and styrene resin at a high temperature brings about the grafting reaction and provides a composition containing polyphenylene ether-grafted polyolefin and/or polystyrene-grafted polyolefin. This method is preferable from an economical point of view.

(4) Diamide compound

The diamide compound used in this invention is represented by the following formula:

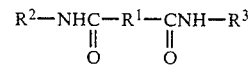

where $R^1$ is a $C_{1-10}$ linear or branched saturated or unsaturated aliphatic hydrocarbon residue, alicyclic hydrocarbon residue, or aromatic hydrocarbon residue, or a residue of a derivative thereof; and $R^2$ and $R^3$ are $C_{1-10}$ linear or branched saturated or unsaturated aliphatic hydrocarbon residues, alicyclic hydrocarbon residues, or aromatic hydrocarbon residues, or residues of derivatives thereof, and $R^2$ and $R^3$ are the same or different from each other.

Examples of $R^1$ include methylene group, ethylene group, trimethylene group, propylene group, tetramethylene group, isobutylene group, pentamethylene group, cyclopentylene group, hexamethylene group, cyclohexylene group, octamethylene group, decamethylene group, and phenylene group.

Examples of $R^2$ and $R^3$ include methyl group, ethyl group, propyl group, isopropyl group, butyl group, isobutyl group, t-butyl group, pentyl group, isopentyl group, cyclopentyl group, hexyl group, isohexyl group, cyclohexyl group, heptyl group, octyl group, decyl group, and phenyl group.

$R^1$, $R^2$, and $R^3$ may have one or more substituents. Examples of the substituents include:
— $R^4$ ($R^4$: $C_{1-8}$ hydrocarbon group)
— X (X: halogen such as Cl, Br, and F)
— $OR^5$ ($R^5$: H or $C_{1-8}$ hydrocarbon group)
— $NR^6R^7$ ($R^6$, $R^7$: H or $C_{1-8}$ hydrocarbon group)
— $OCOR^8$ ($R^8$: H or $C_{1-8}$ hydrocarbon group)
— COOH or metal salt thereof or acid anhydride group
— $SO_3H$
— $NO_2$
— NO
— CN The diamide compound used in this invention is intended to be miscible with the matrix components when the composition is in the flowing state for processing; but it is also intended to crystallize and separate from the matrix components when the molded composition is in use. Therefore, the diamide compound used in this invention should have a melting point slightly lower than the processing temperature.

The processing temperature for the composition of this invention is established between the Tg of matrix (temperature at which the composition starts to flow and the temperature at which the composition starts to decompose.)

The glass transition point (Tg) of the mixture of polyphenylene ether and styrene resin varies depending on its composition. It is 103° C. in the case of composition of polyphenylene ether (1 part) and high-impact polystyrene (99 parts). Therefore, the processing temperature for a composition of polyphenylene ether and styrene resin is usually higher than 103° C. Polyphenylene ether usually begins to decompose at about 350° C. in the air. Thus, the processing is carried out usually at 105° C. to 350° C.

Accordingly, the diamide compound used in this invention should have a melting point higher than 105° C., preferably higher than 130° C., particularly 130° C. to 350° C. A diamide having a melting point lower or higher than the above-mentioned limit may be used in the case where the processing temperature becomes lower or higher than the above-mentioned limit due to the addition of stabilizer or plasticizer. The diamide compound is added in an amount of 0.1 to 25 parts by weight, preferably 0.5 to 20 parts by weight, particularly 2 to 10 parts by weight, based on 100 parts by weight of total polymers.

(5) Additives

The composition of this invention may be incorporated with other additives according to the objects.

The additives include stabilizer, plasticizer, flame-retardant, inorganic filler, mold release, and colorant.

The polyphenylene ether composition of this invention is characteristic in that the flowability is improved and processing is easy to perform even when other additives are added.

Those additives which are most commonly used for the polyphenylene ether composition of this invention are stabilizers, colorants, and flame-retardants. Popular flame-retardants include, for example, phosphoric esters such as trimethyl phosphate, triethyl phosphate, tripropylphosphate, tributyl phosphate, tripentyl phosphate, trihexyl phosphate, triphenyl phosphate, tricresyl phosphate, trixylenyl phosphate, tris(chloroethyl) phosphate, tris(dichloroethyl) phosphate, tris(bromoethyl) phosphate, tris(dibromoethyl) phosphate, tris(chlorophenyl) phosphate, tris(dichlorophenyl) phosphate, tris(bromophenyl) phosphate, and tris(dibromophenyl) phosphate; halogenated aromatic derivatives such as hexabromobenzene, pentabromotoluene, and decabromobiphenyl; antimony compounds such as triphenylantimony, tris(bromophenyl)antimony, tris(dibromophenyl)antimony, and antimony oxide; and halides such as halogenated diphenyl carbonate, halogenated cyclodecane, halogenated phthalic acid anhydride, and halogenated polystyrene.

The polyphenylene ether composition is improved in both flame retardancy and heat resistance when the above-mentioned flame-retardant is used in combination with a bicyclophosphate ester represented by the following formula.

$$R-C\underset{(CH_2)_n-O}{\overset{(CH_2)_l-O}{-(CH_2)_m-O}}P=O$$

where $l$ is an integer of 0 to 2; m is an integer of 1 to 3; n is an integer of 1 to 3; and R is hydrogen or a $C_{1-19}$ alkyl group or derivative thereof.

Examples of this compound include 2,6-trioxano-1-phosphobicyclo[2,2,2]octane-1-oxide, 2,6,7-trioxano-1-phosphobicyclo[2,2,2]octane-4-methyl-1-oxide, and 2,6,7-trioxano-1-phosphobicyclo[2,2,2]octane-4-hexadecyl-1-oxide.

These flame retardants may be used individually or in combination with one another.

The invention is now described in more detail with reference to the following examples and comparative examples.

Compositions and physical properties of the high impact polystyrene and styrene-butadiene copolymer used in the Examples of the present invention were measured.

The results obtained are shown below.

High impact polystyrene:

| | Molecular Weight | | | |
|---|---|---|---|---|
| Tradename | Number Average ($\times 10^4$) | Weight Average ($\times 10^4$) | Rubber Content (wt %) | MFR (200° C., 5 Kg load) |
| HT-76 | 9.2 | 24 | 7.6 | 2.5 |
| 475D | 11 | 25.4 | 8.1 | 1.8 |

| Styrene-butadiene copolymer | | |
|---|---|---|
| Tradename | Styrene Content (wt %) | Mooney Viscosity $ML_{100}^{1+4}$ |
| 1502 | 23.5 | 52 |

EXAMPLE 1 and COMPARATIVE EXAMPLE 1

The following components were melted and mixed at 260° C. for 7.5 minutes by using a Brabender.

50 parts by weight of poly-2,6-dimethyl-1,4-phenylene ether (having an intrinsic viscosity of 0.50 measured in chloroform at 25° C.; made by Mitsubishi Petrochemical Co., Ltd.).

50 parts by weight of high-impact polystyrene (475D, a product of Asahi Dow Co., Ltd.).

5 parts by weight of N,N'-diphenyladipic acid diamide (having a melting point of 235° C. as measured with the melting point measuring apparatus MP-1 made by Yamato Kagaku Co., Ltd.).

After mixing was complete, the melt index at 250° C. under a load of 10 kg was measured, which indicates the processability (flowability) of the composition. The composition was press-formed into test pieces for measurement of heat distortion temperature under a load of 18.6 kg/cm².

In Comparative Example 1, the diamide was not used. The results are shown in Table 1 and FIG. 1.

EXAMPLES 2 to 5 and

COMPARATIVE EXAMPLES 2 to 5

The same experiments as in Example 1 and Comparative Example 1 were carried out except the ratio of poly-2,6-dimethyl-1,4-phenylene ether to high-impact polystyrene was changed as follows:

70/30 (Example 2 and Comparative Example 2),
60/40 (Example 3 and Comparative Example 3),
40/60 (Example 4 and Comparative Example 4), and
30/70 (Example 5 and Comparative Example 5).

The results are shown in Table 1 and FIG. 1.

It is noted in Table 1 that the composition is remarkably improved in flowability by adding 5 parts of N,N'-diphenyladipic acid diamide.

In FIG. 1, the melt index is plotted against the heat distortion temperature.

TABLE 1

| | Polyphenylene ether (parts by weight) | High-impact Polystyrene (parts by weight) | N,N'—diphenyladipic acid diamide (parts by weight) | Melt index (g/10 min) | Heat distortion temperature (°C.) |
|---|---|---|---|---|---|
| Example No. 1 | 50 | 50 | 5 | 10 | 128 |

TABLE 1-continued

|  | Polyphenylene ether (parts by weight) | High-impact Polystyrene (parts by weight) | N,N'—diphenyl-adipic acid diamide (parts by weight) | Melt index (g/10 min) | Heat distortion temperature (°C.) |
|---|---|---|---|---|---|
| No. 2 | 70 | 30 | 5 | 2.8 | 148 |
| No. 3 | 60 | 40 | 5 | 5.2 | 140 |
| No. 4 | 40 | 60 | 5 | 15.1 | 121 |
| No. 5 | 30 | 70 | 5 | 39.6 | 101 |
| Comparative Example No. 1 | 50 | 50 | — | 3.4 | 130 |
| No. 2 | 70 | 30 | — | 0.9 | 152 |
| No. 3 | 60 | 40 | — | 1.7 | 143 |
| No. 4 | 40 | 60 | — | 5.2 | 122 |
| No. 5 | 30 | 70 | — | 13 | 104 |

Line A obtained by plotting the data of Comparative Examples 1 to 5 indicates how the flowability (melt index) is related with the heat resistance (heat distortion temperature) when the ratio of poly-2,6-dimethyl-2,4-phenylene ether to high-impact polystyrene is changed continuously.

In other words, line A indicates that as the ratio of high-impact polystyrene is increased, the flowability (melt index) increases but the heat distortion temperature decreases.

On the other hand, line B obtained by plotting the data in Examples 1 to 5 lies above line A. This apparently indicates the effect of this invention.

EXAMPLES 6 to 13 and COMPARATIVE EXAMPLES 6 to 10

In Examples 6 to 13, the same experiments as in Example 1 were carried out except the quantity of N,N'-diphenyladipic acid diamide was changed to 0.5, 1, 3, 8, 10, 12, 15, and 20 parts by weight. The results are shown in Table 2 and FIG. 2.

In Comparative Example 6 to 10, N,N'-diphenyladipic acid diamide was replaced by triphenyl phosphate in an amount of 2, 3, 5, 7, and 10 parts by weight. It is a plasticizer which is known to produce the effect of improving the flowability of polyphenylene ether or a composition of polyphenylene ether and styrene resin. The results are shown in Table 2 and FIG. 2.

Figure 2:
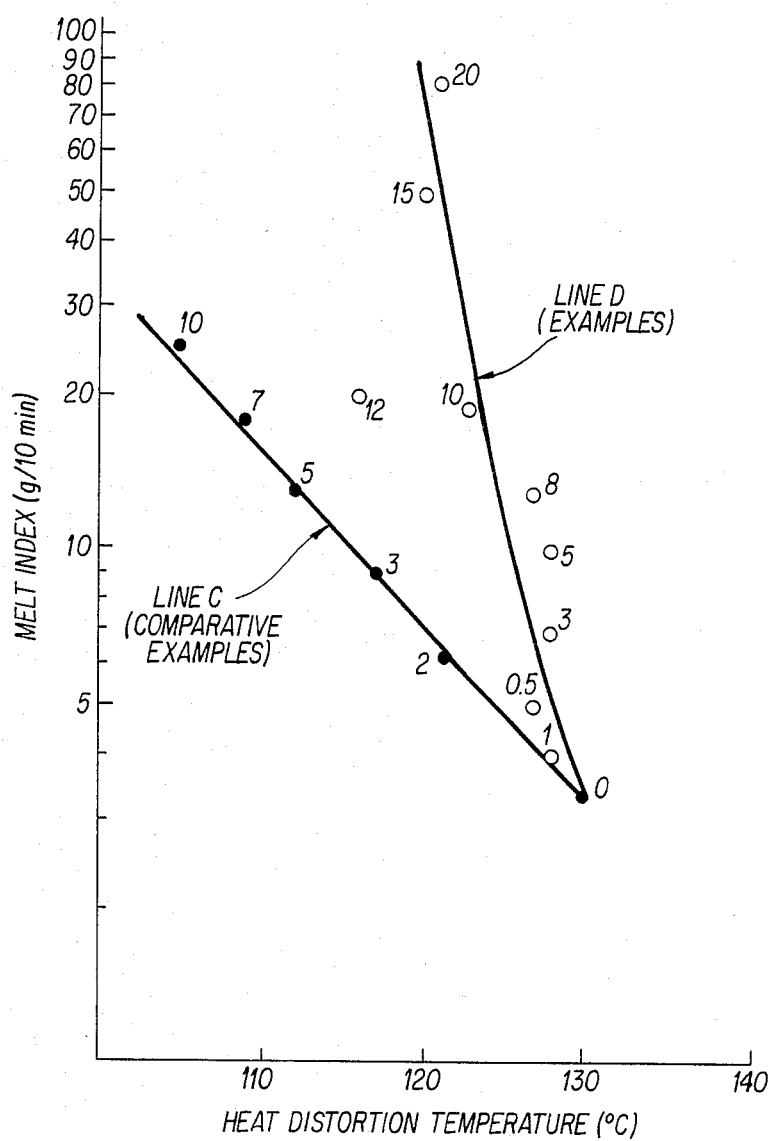

FIG. 2 is based on the data in Table 2. In FIG. 2, the flowability (melt index) is plotted against the heat resistance (heat distortion temperature). The superscripts indicate the quantity of N,N'-diphenyl adipic acid diamide or triphenyl phosphate added.

Triphenyl phosphate is a well-known flame retardant as well as a plasticizer. As the addition of this compound is increased, the composition greatly improves in processability (flowability) but decreases in heat resistance (heat distortion temperature). See line C in FIG. 2.

On the other hand, line D in FIG. 2 indicates that as N,N'-diphenyl adipic acid diamide is added more, the flowability is greatly improved with a minimum of decrease in heat resistance (heat distortion temperature).

TABLE 2

|  | N,N'—diphenyl-adipic acid diamide (parts by weight) | Triphenyl phosphate (parts by weight) | Melt index (g/10 min) | Heat distortion temperature (°C.) |
|---|---|---|---|---|
| Example No. | | | | |
| 6 | 0.5 | — | 5.0 | 127 |
| 7 | 1 | — | 4.0 | 128 |
| 8 | 3 | — | 7.0 | 128 |
| 1 | 5 | — | 10 | 128 |
| 9 | 8 | — | 13 | 127 |
| 10 | 10 | — | 19 | 123 |
| 11 | 12 | — | 20 | 116 |
| 12 | 15 | — | 50 | 120 |
| 13 | 20 | — | 82 | 121 |
| Comparative Example No. | | | | |
| 1 | — | — | 3.4 | 130 |
| 6 | — | 2 | 6.3 | 122 |
| 7 | — | 3 | 9.0 | 117 |
| 8 | — | 5 | 13 | 112 |
| 9 | — | 7 | 18 | 109 |
| 10 | — | 10 | 25 | 105 |

[Polyphenylene ether/high-impact polystyrene = 50/50]

EXAMPLE 14

Example 1 was repeated except that N,N'-diphenyladipic acid diamide was replaced by 5 parts by weight of N,N'-dihexyladipic acid diamide (having a melting point of 158° C. as measured by MP-21 made by Yamato Kagaku Co., Ltd.). The results are shown in Table 3.

EXAMPLE 15

Example 1 was repeated except that N,N'-diphenyladipic acid diamide was replaced by 5 parts by weight of N,N'-dihexylterephthalic acid diamide (having a melting point of 204° C. as measured by MP-21 made by Yamato Kagaku Co., Ltd.). The results are shown in Table 3.

EXAMPLE 16

Example 1 was repeated except that N,N'-diphenyladipic acid diamide was replaced by 5 parts by weight of N,N'-dihexylsuccinic acid diamide (having a melting point of 226° C. as measured by MP-21 made by Yamato Kagaku Co., Ltd.). The results are shown in Table 3.

EXAMPLE 17

Example 1 was repeated except that N,N'-diphenyladipic acid diamide was replaced by 5 parts by weight of N,N'-dihexylsebacic acid diamide (having a melting point of 196° C. as measured by MP-21 made by Yamato Kagaku Co., Ltd.). The results are shown in Table 3.

TABLE

| Example No. | Name | Melting point (°C.) | Quantity added (parts) | Melt index (g/10 min) | Heat distortion temperature (°C.) |
|---|---|---|---|---|---|
| 14 | N,N'—dihexyladipic acid diamide | 158 | 5 | 13 | 126 |
| 15 | N,N'—dihexylterephthalic acid diamide | 204 | 5 | 12 | 127 |
| 16 | N,N'—diphenylsuccinic acid diamide | 226 | 5 | 11 | 127 |
| 17 | N,N'—dihexylsebacic acid diamide | 196 | 5 | 12 | 127 |
| Comparative Example No. | | | | | |
| 1 | none | — | — | 3.4 | 130 |
| 8 | Triphenyl phosphate | 49 | 5 | 13 | 112 |

EXAMPLE 18 and COMPARATIVE EXAMPLE 11

The following components were dry-blended by using a supermixer, and then mixed and pelletized at 340° C. by using a twin-screw extruder (PCM-450) made by Ikegai Iron Works, Ltd.
- 60 parts by weight of poly-2,6-dimethyl-1,4-phenylene ether (having an intrinsic viscosity of 0.50 measured in chloroform at 25° C.; made by Mitsubishi Petrochemical Co., Ltd.).
- 40 parts by weight of high-impact polystyrene (HT-76, a product of Mitsubish Monsanto Co., Ltd.).
- 5 parts by weight of N,N'-diphenylterephthalic acid diamide (having a melting point of 337° C. as measured with the melting point measuring apparatus MP-21 made by Yamato Kagaku Co., Ltd.).

The resulting pellets were injection-molded at a temperature of 340° C. under an injection pressure of 1000 kg/cm$^2$ by using an injection molding machine N-100 (made by The Japan Steel Works, Ltd.) to measure the flow distance in a spiral cavity, 2 mm thick and 8 mm wide. Test pieces for measuring heat distortion temperature were also formed by using the same injection molding machine as above.

In Comparative Example, the same experiments as in Example were carried out except that N,N'-diphenylterephthalic acid diamide was not used. The results are shown in Table 4.

EXAMPLE 19

Example 18 was repeated except that N,N'-diphenylterephthalic acid diamide was replaced by N,N'-diphenylfumaric acid diamide (having a melting point of 314° C. as measured with the melting point measuring apparatus MP-21 made by Yamato Kagaku Co., Ltd.). The results are shown in Table 4.

TABLE 4

| | Spiral flow distance (mm) | Heat distortion temperature (°C.) |
|---|---|---|
| Example 18 | 360 | 143 |
| Example 19 | 410 | 141 |
| Comparative Example 11 | 210 | 144 |

EXAMPLES 20 to 26 and COMPARATIVE EXAMPLES 12 to 14

The following components were dry-blended in the ratio shown in Table 5 by using a supermixer, and then mixed and pelletized at 280° C. by using a twin-screw extruder (PCM-450) made by Ikegai Iron Works, Ltd. Poly-2,6-dimethyl-1,4-phenylene ether (having an intrinsic viscosity of 0.47 measured in chloroform at 30° C.; made by Mitsubishi Petrochemical Co., Ltd.). Polystyrene (HF-77, a product of Mitsubish Monsanto Co., Ltd.), Maleic anhydride-grafted ethylene-propylene copolymer (containing 1.5 wt % of maleic acid anhydride; made by Mitsubishi Petrochemical Co., Ltd.). Styrene-butadiene copolymer (1502, a product of Japan Synthetic Rubber Co., Ltd.), Precipitated calcium carbonate (having an average particle diameter of 0.2 micron), and N,N'-diphenyladipic acid diamide.

The resulting pellets were injection-molded at a temperature of 300° C. under an injection pressure of 1100 kg/cm$^2$ by using an injection molding machine N-100 (made by The Japan Steel Works, Ltd.) to measure the flow distance in a spiral cavity, 2 mm thick and 8 mm wide. Test pieces for measuring heat distortion temperature were also formed by using the same injection molding machine as above.

In Comparative Examples, the same experiments as in Examples were carried out except that N,N'-diphenyladipic acid diamide was not used. The results are shown in Table 5 and FIG. 3.

Figure 3:
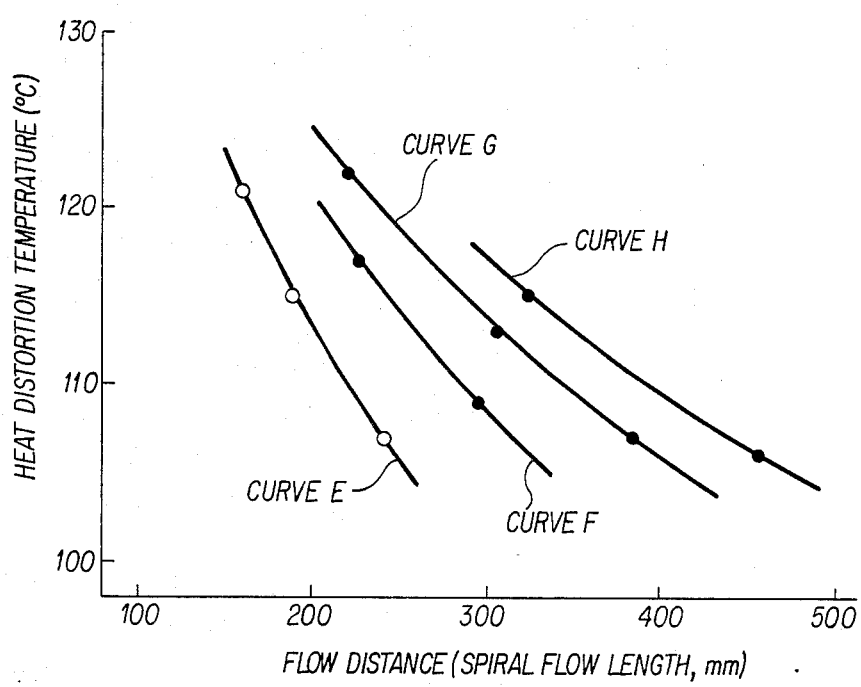
FIGS. 3 and 4 are graphs showing the relationship between the heat distortion temperature and the spiral flow length of polyphenylene ether compositions produced according to this invention and the conventional method.

In FIG. 3, the flowability (spiral flow distance) is plotted against the heat resistance (heat distortion temperature) based on the data in Table 5. Curve E was obtained by plotting the data in Comparative Examples 12, 13, and 14 in which N,N'-diphenyladipic acid diamide was not used. In this case, the flowability of the composition can be changed by the mixing ratio of poly-2,6-dimethyl-1,4-phenylene ether and polystyrene, but its extent is limited. On the other hand, the curve is shifted rightward when N,N'-diphenyladipic acid diamide is added. (Curve F for Examples 20 and 21; curve G for Examples 22 to 24; and curve H for Examples 25 and 26) This suggests that the composition of this invention is greatly improved in flowability with no loss of heat resistance.

TABLE 5

| | Examples | | | | | | | Comparative Examples | | |
|---|---|---|---|---|---|---|---|---|---|---|
| | 20 | 21 | 22 | 23 | 24 | 25 | 26 | 12 | 13 | 14 |
| Formulation (parts by weight) | | | | | | | | | | |
| Poly-2,6-dimethyl-1,4-phenylene ether | 57 | 48 | 64 | 52 | 45 | 56 | 43 | 53 | 48 | 39 |
| Polystyrene | 33 | 42 | 26 | 38 | 45 | 34 | 47 | 37 | 42 | 51 |
| Maleic anhydride grafted-ethylene-propylene copolymer | 5 | 5 | 5 | 5 | 5 | 5 | 5 | 5 | 5 | 5 |
| Styrene-butadiene copolymer | 5 | 5 | 5 | 5 | 5 | 5 | 5 | 5 | 5 | 5 |
| Calcium carbonate | 5 | 5 | 5 | 5 | 5 | 5 | 5 | 5 | 5 | 5 |
| N,N'—diphenyladipic acid diamide | 5 | 5 | 7 | 7 | 7 | 10 | 10 | — | — | — |
| Performance | | | | | | | | | | |
| Spiral flow distance (mm) | 228 | 296 | 221 | 308 | 386 | 326 | 458 | 162 | 190 | 242 |
| Heat distortion temperature, 18.6 kg load (°C.) | 117 | 109 | 122 | 113 | 107 | 115 | 106 | 121 | 115 | 107 |

EXAMPLES 27 and 28 and COMPARATIVE EXAMPLES 15 and 16

The following components were uniformly blended in the ratio shown in Table 6 by using a supermixer, and then mixed for grafting at 280° C. and pelletized by using a twin-screw extruder (PCM-450) made by Ikegai Iron Works, Ltd. Poly-2,6-dimethyl-1,4-phenylene ether (having an intrinsic viscosity of 0.48 as measured in chloroform at 30° C.; made by Mitsubishi Petrochemical Co., Ltd.), Polystyrene (HF-77, a product of Mitsubish Monsanto Co., Ltd.), Ethylene-vinyl acetate-glycidyl methacrylate copolymer (MFR=4, containing 5 wt % of vinyl acetate and 10 wt % of glycidyl methacrylate; made by Mitsubishi Petrochemical Co. Ltd.), Styrene-maleic anhydride copolymer (containing 10 wt % of maleic acid anhydride), made by Arcopolymer Co., Ltd.), and N,N'-diphenyladipic acid diamide.

The resulting pellets were injection-molded in the same way as in Example 20 to measure the flow distance (spiral flow) and heat distortion temperature.

In Comparative Examples, the same experiments as in Examples were carried out except that N,N'-diphenyladipic acid diamide was not used. The results are shown in Table 6 and FIG. 4.

Figure 4:
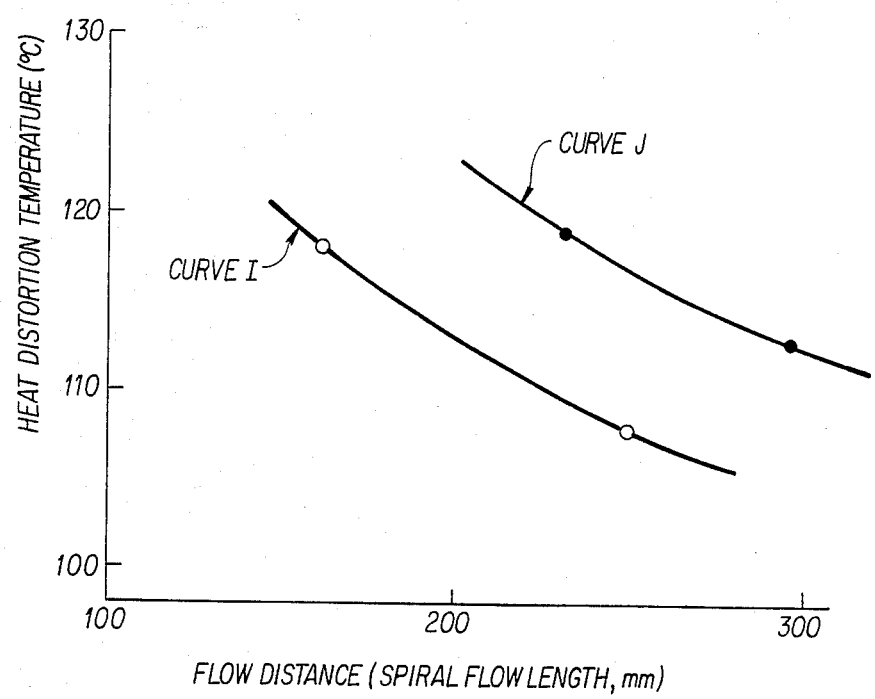

In FIG. 4, the flowability (spiral flow distance) is plotted against the heat resistance (heat distortion temperature) based on the data in Table 6. Curve I was obtained by plotting the data in Comparative Examples 15 and 16 in which N,N'-diphenyladipic acid diamide was not used, and curve J was obtained by plotting the data in Examples 27 and 28. These results suggest that the composition of this invention is greatly improved in flowability with no loss of heat resistance.

TABLE 6

| | Examples | | Comparative Examples | |
|---|---|---|---|---|
| | 27 | 28 | 15 | 16 |
| Formulation (parts by weight) | | | | |
| Poly-2,6-dimethyl-1,4-phenylene ether | 50 | 55 | 50 | 42 |
| Polystyrene | 40 | 35 | 40 | 48 |
| Ethylene-vinyl acetate glycidylmethacrylate copolymer | 10 | 10 | 10 | 10 |
| Styrene-maleic anhydride copolymer | 10 | 10 | 10 | 10 |
| N,N'—diphenyladipic acid diamide | 5 | 5 | — | — |
| Performance | | | | |
| Spiral flow distance (mm) | 296 | 232 | 162 | 250 |
| Heat distortion temperature, 18.6 kg load (°C.) | 113 | 119 | 118 | 108 |

EXAMPLE 29 and COMPARATIVE EXAMPLE 17

The following components were uniformly blended in the ratio shown in Table 7 by using a supermixer, and then mixed at 280° C. and pelletized by using a twin-screw extruder (PCM-450) made by Ikegai Iron Works, Ltd. Poly-2,6-dimethyl-1,4-phenylene ether (having an intrinsic viscosity of 0.47 measured in chloroform at 30° C.; made by Mitsubishi Petrochemical Co , Ltd.), Polystyrene (HF-77, a product of Mitsubish Monsanto Co., Ltd.), Maleic anhydride-grafted ethylene-propylene copolymer (containing 1.5 wt % of maleic anhydride; made by Mitsubishi Petrochemical Co., Ltd.), Styrene-butadiene copolymer (1502, a product of Japan Synthetic Rubber Co., Ltd.), Precipitated calcium carbonate (average particle diameter 0.2 micron), Triphenyl phosphate (flame retardant), and N,N'-diphenyladipic acid diamide.

The resulting pellets were injection-molded at a temperature of 300° C. under an injection pressure of 1100 kg/cm² by using an injection molding machine N-100 (made by The Japan Steel Works Ltd.) to measure the flow distance in a spiral cavity, 2 mm thick and 8 mm wide. Test pieces were formed by using the same injection molding machine as above, for evaluating the flame retardance according to UL Standards, Subject 94.

In Comparative Example, the same experiments as in Example were carried out except that N,N'-diphenyladipic acid diamide was not used. The results are shown in Table 7. These results suggest that the addition of N,N'-diphenyladipic acid diamide greatly improves the flowability of the composition without any adverse effect on flame retardance.

TABLE 7

| | Example 29 | Comparative Example 17 |
|---|---|---|
| Formulation (parts by weight) | | |
| Poly-2,6-dimethyl-1,4-phenylene ether | 45 | 45 |
| Polystyrene | 45 | 45 |
| Maleic anhydride-grafted ethylene-propylene copolymer | 5 | 5 |
| Styrene-butadiene | 5 | 5 |

TABLE 7-continued

|  | Example 29 | Comparative Example 17 |
|---|---|---|
| copolymer |  |  |
| Calcium carbonate | 5 | 5 |
| Triphenyl phosphate | 8 | 8 |
| N,N'—diphenyladipic acid diamide | 5 | — |
| Performance |  |  |
| Spiral flow distance (mm) | 522 | 390 |
| Flame retardance according to UL-94 (1.59 mm thick specimen) | 94V-1 | 94V-1 |

EXAMPLE 30 and COMPARATIVE EXAMPLE 18

The following components were uniformly blended in the ratio shown in Table 8 by using a supermixer, and then mixed at 280° C. and pelletized by using a twin-screw extruder (PCM-450) made by Ikegai Iron Works, Ltd. Poly-2,6-dimethyl-1,4-phenylene ether (having an intrinsic viscosity of 0.45 measured in chloroform at 30° C.; made by Mitsubishi Petrochemical Co., Ltd.), Polystyrene (HF-77, a product of Mitsubish Monsanto Co., Ltd.), Maleic anhydride-grafted ethylene-propylene copolymer (containing 1.5 wt % of maleic anhydride; made by Mitsubishi Petrochemical Co., Ltd.), Styrene-butadiene copolymer (1502, a product of Japan Synthetic Rubber Co., Ltd.), Precipitated calcium carbonate (average particle diameter 0.2 micron), 2,6,7-trioxa-1-phosphobicyclo[2,2,2]octane-4-ethyl-1-oxide (flame retardant), and N,N'-diphenyladipic acid diamide.

The resulting pellets were injection-molded at a temperature of 300° C. under an injection pressure of 1100 kg/cm$^2$ by using an injection molding machine N-100 (made by The Japan Steel Works, Ltd.) to measure the flow distance in a spiral cavity, 2 mm thick and 8 mm wide. Test pieces were formed by using the same injection molding machine as above, for evaluating the flame retardance according to UL Standards, Subject 94.

In Comparative Example, the same experiments as in Example were carried out except that N,N'-diphenyladipic acid diamide was not used. The results are shown in Table 8. These results suggest that the addition of N,N'-diphenyladipic acid diamide greatly improves the flowability of the composition without any adverse effect on flame retardance.

TABLE 8

|  | Example 30 | Comparative Example 18 |
|---|---|---|
| Formulation (parts by weight) |  |  |
| Poly-2,6-dimethyl-1,4-phenylene ether | 65 | 65 |
| Polystyrene | 25 | 25 |
| Maleic anhydride-grafted ethylene-propylene copolymer | 5 | 5 |
| Styrene-butadiene copolymer | 5 | 5 |
| Calcium carbonate | 5 | 5 |
| 2,6,7-trioxa-1-phosphobicyclo[2,2,2]octane-4-ethyl | 5 | 5 |
| N,N'—diphenyladipic acid diamide | 6 | — |
| Performance |  |  |
| Spiral flow distance (mm) | 295 | 203 |
| Flame retardance according to UL-94 (1.59 mm thick specimen) | 94V-1 | 94V-1 |

What is claimed is:

1. A polyphenylene ether composition having improved processability comprising:
    (a) a polyphenylene ether; and
    (b) 0.1–25 weight % of the composition, of a diamide compound of the formula

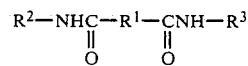

wherein
    $R^1$ is a $C_{1-10}$ linear or branched saturated or unsaturated aliphatic hydrocarbon residue, an alicyclic hydrocarbon residue, or an aromatic hydrocarbon residue; and
    $R^2$ and $R^3$, which may be the same or different, each is $C_{1-10}$ linear or branched saturated or unsaturated aliphatic hydrocarbon residues, alicyclic hydrocarbon residues, or aromatic hydrocarbon residues;
    wherein $R^1$, $R^2$ and $R^3$ may have one or more substituents selected from the group consisting of:
    —$R^4$, wherein $R^4$ is $C_{1-8}$ hydrocarbon;
    —X, wherein X is a halogen selected from the group consisting of Cl, Br, and F;
    —$OR^5$, wherein $R^5$ is H or $C_{1-8}$ hydrocarbon;
    —$NR^6R^7$, wherein $R^6$ and $R^7$ are H or $C_{1-8}$ hydrocarbon;
    —$OCOR^8$, wherein $R^8$ is H or $C_{1-8}$ hydrocarbon;
    —COOH, a metal salt thereof or acid anhydride thereof;
    —$SO_3H$;
    —$NO_2$;
    —NO; and
    —CN.

2. A polyphenylene ether composition as claimed in claim 1, wherein the diamide compound has a melting point of 105° C. or more.

3. A polyphenylene ether composition as claimed in claim 1, wherein the amount of the diamide compound is 2 to 10 parts by weight per 100 parts by weight of the total polymer.

4. The polyphenylene ether composition as claimed in claim 1, wherein
    $R^2$ and $R^3$ in the diamide compound are phenyl, which may have one or more substitutents selected from the group consisting of
    —$R^4$, wherein $R^4$ is $C_{1-8}$ hydrocarbon;
    —X, wherein X is a halogen selected from the group consisting of Cl, Br, and F;
    —$OR^5$, wherein $R^5$ is H or $C_{1-8}$ hydrocarbon;
    —$NR^6R^7$, wherein $R^6$ and $R^7$ are H or $C_{1-8}$ hydrocarbon;
    —$OCOR^8$, wherein $R^8$ is H or $C_{1-8}$ hydrocarbon;
    —COOH, a metal salt thereof or acid anhydride thereof;
    —$SO_3H$;
    —$NO_2$;
    —NO;
    —CN; and the diamide compound has a melting point of 130° C. or more.

5. A polyphenylene ether composition as claimed in claim 1, further including a styrene resin in an amount up to 2,000 parts by weight per 100 parts by weight of the polyphenylene ether.

6. The polyphenylene ether composition as claimed in claim 5, wherein the styrene resin is a high impact polystyrene comprising polystyrene modified with a rubber selected from the group consisting of butadiene rubber, styrene-butadiene copolymer, and ethylene-propylene copolymer, or ethylene-propylene-diene terpolymer.

7. The polyphenylene ether composition as claimed in claim 1, which further comprises
   (c) a styrene resin in an amount of 0 to 2,000 parts by weight per 100 parts by weight of the polyphenylene ether; and
   (d) a rubber polymer selected from the group consisting of natural rubber, polyisoprene, polybutadiene, ethylene-propylene copolymer, and ethylene-propylene-nonconjugated diene terpolymer in an amount of 0.5 to 50 wt % based on the weight of the total polymer.

8. A polyphenylene ether composition as claimed in claim 1, which comprises the polyphenylene ether, a styrene resin in an amount of 0 to 2,000 parts by weight per 100 parts by weight of the polyphenylene ether, a rubbery polymer in an amount of 0.5 to 50 wt % based on the weight of the total polymer, an inorganic filler in an amount of 0.5 to 60 wt % based on the weight of the composition, and a diamide compound.

9. The polyphenylene ether composition as claimed in claim 1, which further comprises
   (c) a styrene resin comprising styrene polymers selected of from the group consisting of
   homopolymers of styrene, α-methylstyrene and p-methylstyrene;
   high impact polystyrene comprising polystyrene modified with a rubber selected from the group consisting of
   butadiene rubber, styrene-butadiene copolymer, ethylene-propylene copolymer, and ethylene-propylenediene terpolymer;
   styrene-butadiene copolymer; and
   styrene-acrylonitrile-butadiene copolymer, in an amount of 0 to 2,000 parts by weight per 100 parts by weight of the polyphenylene ether; and
   (d) a polystyrene-grafted polyolefin selected from the group consisting of a styrene copolymer having a COOH or a cyclic anhydride, grafted onto polyolefins having glycidyl groups of the side chain, in an amount of 1 to 30 wt % based on the weight of the total polymer;
   (e) a polyphenylene ether-grafted polyolefin selected from the group consisting of glycidated polyphenylene ethers grafted onto polyolefins having a COOH or anhydride and polyphenylene ethers grafted onto polyolefins having a glycidyl group on a side chain, in an amount of 1 to 30 wt % based on the weight of the total polymer.

* * * * *